United States Patent
Buntin

[15] 3,698,026
[45] Oct. 17, 1972

[54] SWIMMING TEACHING AND TRAINING AID

[72] Inventor: Jenry J. Buntin, P.O. Box 18, Murray Hill, N.J. 07974

[22] Filed: Oct. 15, 1970

[21] Appl. No.: 81,038

[52] U.S. Cl. ................................................9/308
[51] Int. Cl. ......................................A63b 31/02
[58] Field of Search..................9/307, 308, 301

[56] References Cited

UNITED STATES PATENTS 3,263,248   8/1966   Wendorf.......................9/308
2,745,119   5/1956   Whipple........................9/307
1,754,704   4/1930   Wilcox..........................9/307

FOREIGN PATENTS OR APPLICATIONS 1,046,933   7/1953   France..........................9/307

Primary Examiner—George E. A. Halvosa
Attorney—Auslander and Thomas

[57] ABSTRACT

A special mitt aids teacher and competition swimmer in training by allowing near natural swimming with accentuation of errors or strength building with proper strokes.

6 Claims, 4 Drawing Figures

PATENTED OCT 17 1972 3,698,026

INVENTOR.
HENRY J. BUNTIN
BY Auslander + Thomas
ATTORNEYS

SWIMMING TEACHING AND TRAINING AID

The present invention relates to a hand-worn swim teaching and training aid.

Many devices of the past have been provided in some glove-like form to help a swimmer to increase the hand to water resistance for increasing swimming ease, speed or ability to swim.

Such devices of the past have provided some form of glove-like portion and a surface designed to engage the water. The usual advantages in such devices of the past were in their ability to increase the resistance area engaged between the hand and swimming device or to improve the mode of firmly attaching such type of devices to the swimmer's hand.

In the training of swimmers, particularly for competition swimming, the glove-like devices of the past have been of limited practical value, for, among other things, they did not aid in the practice of a hand stroke in substantially the same way a normal swimming stroke is done in competition.

In most swimming meets no artificial aids are allowed. Competition depends upon the unaided skill of the individual swimmer.

While the pad and glove-like devices of the past may aid in speed swimming, such devices have not been designed to aid the competitor to have greater skill in swimming without such devices after prior training with the pads and glove-like devices of the past.

According to the present invention, finger covering devices are provided to increase the resistance between the swimmer's hand and the water in such a way as to accentuate both proper and improper swimming techniques as a swimming training and teaching aid.

As a training aid, the naturalness of normal hand position is maintained by providing a planar resistance surface of the training aid over only the four fingers of the hand, leaving the thumb exposed.

Although such novel feature or features believed to be characteristic of the invention are pointed out in the claims, the invention and the manner in which it may be carried out may be further understood by reference to the description following and the accompanying drawings.

Referring now to the figures in greater detail, where like reference numbers denote like parts in the various figures.

Figure 1:
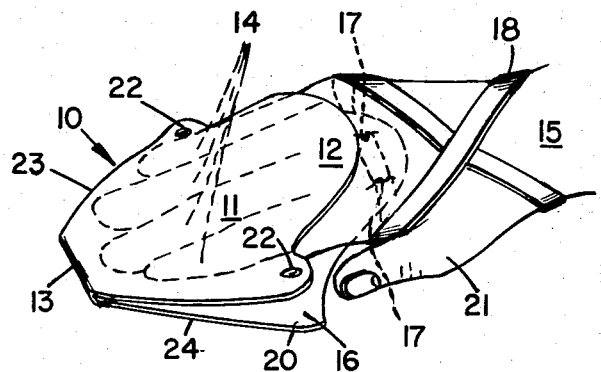
FIG. 1 is a training aid of the present invention shown on a hand.

The training aid 10 is preferably made of an integral single folded sheet 11 of hard, but somewhat flexible plastic.

It should be understood that all references to the training aid 10 of the present invention as shown in the figures apply equally to a left-handed training aid 10 not shown in the figures.

Whether or not the training aid 10 of the present invention is made from a plastic sheet 11 or constructed in some other mode, the training aid 10 has substantially the same elements.

A top portion 12 extends at least part way back from the end portion 13 and is configured to override the fingers 14 of the hand 15 to maintain the fingers 14 engaged in the training aid 10 while it is in use and in substantially normal swimming position.

The end portion 13 is preferably without openings which might create turbulence between the training aid 10, the top portion 12 and the finger 14. The end portion 13 also acts as a folding point when the training aid 10 is made of a single plastic sheet 11 as shown.

Figure 2:
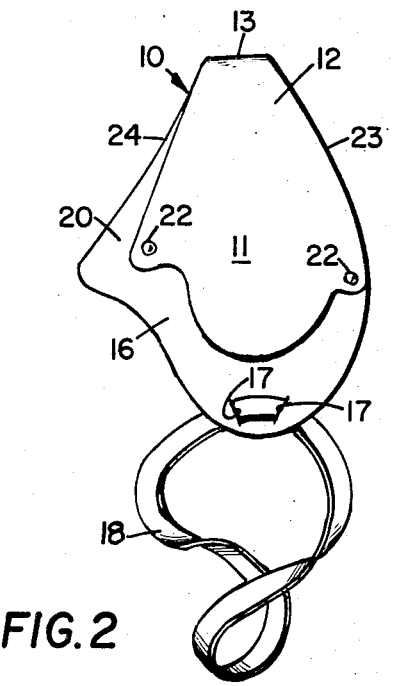
FIG. 2 is a plan view of the training aid of FIG. 1.
Figure 3:
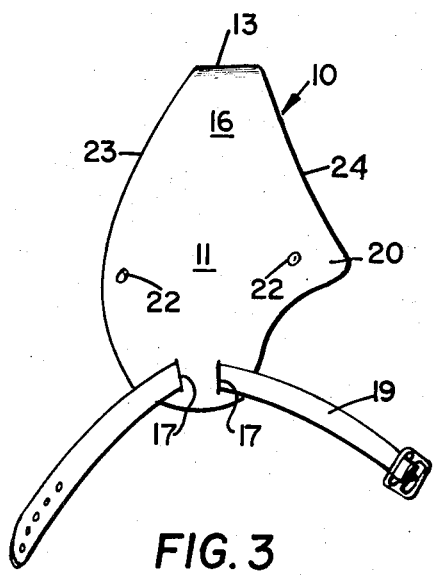
FIG. 3 is a bottom plan view of the training aid of the present invention with a variant strap.
Figure 4:
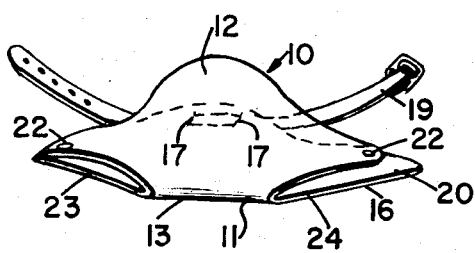
FIG. 4 is a front elevation of FIG. 3.

The bottom portion 16 of the training aid 10 preferably extends further backward than the top portion 12 to provide a flat surface to cover the swimmer's palm. The bottom portion preferably includes openings 17 through which may be threaded an elastic hand strap 18 as shown in FIGS. 1 and 2, or a buckle strap 19 to affix the training aid 10 to the swimmer's hand 15 about the wrist.

The bottom portion 16 slopes inward from a protrusion 20 which is contoured to allow the thumb 21 to be substantially normally exposed to the water, unobstructed by the bottom portion 16.

The top portion 12 and bottom portion 16 may be joined as shown in the figures by rivets 22, preferably having lower surfaces that do not change the flat contour of the bottom portion 16, and yet strong enough to hold the sheet 11 of the training aid 10 to endure the stress of swimming.

In use, the training aid 10 of the present invention is engaged on the swimmer's hands 15 and strapped to the swimmer's wrists. The bottom portion 16 may have a slight curvature to eliminate unwarranted sliding action when in use.

The extra resistance the palm of the swimmer encounters with the training aid 10 of the present invention is limited to the four fingers and palm area of the hand 15. The top portion 12 substantially follows the contours of the hand 15 so that with the thumb 21 unencumbered, the training aid 10 provides extra resistance in swimming under substantially otherwise normal conditions with almost any stroke.

The outside edge 23 of the training aid 10 is rounded to the natural curve of the hand. The inside edge 24 of the training aid 10 is substantially straight, offering a more resistant cutting edge in the water, thus making it easier for the swimmer to feel the greater resistance and improvement of stroke by a proper degree of inward turn of the hand.

The swimmer especially under the guidance of a teacher using the training aid 10 of the present invention, can "feel" the maximum application of the action-reaction component of a stroke to maximize resistance for the greatest swimming power and optimum stroke length.

Stroke errors are accentuated for both the swimmer to feel and the teacher to observe. The lower resistance of the hand 15 placed in the water improperly is usually visible to the teacher and felt by the swimmer by the faster skimming of the hand. The swimmer's hand and arms and muscles are thus developed and attuned to natural swimming hand position and muscular development.

From the competitor's point of view, the extra resistance of the training aid 10 of the present invention reduces the necessary water and practice time and in competition, without the training aid 10 of the present invention, the swimmer may feel more relaxed to swim faster without the extra resistance of the training aid 10 of the present invention having the extra strength already developed in the use of the training aid 10 now going into faster natural swimming ability.

The terms and expressions which are employed are used as terms of description; it is recognized, though, that various modifications are possible.

Having thus described certain forms of the invention in some detail, what is claimed is:

1. A swimming training aid to be secured to the hand of a swimmer comprising a substantially planar portion approximately the size of the width of the fingers and extending to cover approximately no more than the palm of the hand, a second portion integrally joined to said planar portion and adapted to override at least the tips of said fingers and cover only the area of said fingers, said planar and second portion connected to each other outward of said finger area, and holding means at one end of said aid adapted to fasten said aid about the wrist to said hand.

2. The invention of claim 1 wherein said planar portion is slightly curved inward toward the palm of said hand.

3. The invention of claim 1 wherein at least said planar portion protrudes laterally forming a substantially contiguous line with the thumb of said hand free of any overlapping of said thumb when said thumb is substantially held forward and unbent.

4. The invention of claim 1 wherein said holding means is a strap and buckle.

5. The invention of claim 1 wherein said holding means is an elastic strap.

6. The invention of claim 1 wherein said planar and second portions are held by rivets.

* * * * *